(12) United States Patent  
Chen et al.

(10) Patent No.: US 8,870,170 B2
(45) Date of Patent: Oct. 28, 2014

(54) SLIDE POSITIONING DEVICE

(75) Inventors: Wen-Sheng Chen, Shenzhen (CN); Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 980 days.

(21) Appl. No.: 12/975,743

(22) Filed: Dec. 22, 2010

(65) Prior Publication Data

US 2012/0049431 A1 Mar. 1, 2012

(30) Foreign Application Priority Data

Aug. 31, 2010 (CN) .......................... 2010 1 0268112

(51) Int. Cl.
*B23Q 1/64* (2006.01)
*F16M 11/04* (2006.01)
(52) U.S. Cl.
CPC ....... *F16M 11/043* (2013.01); *F16M 2200/028* (2013.01)
USPC ................... 269/56; 269/67; 269/68; 269/72
(58) Field of Classification Search
USPC ...... 269/55, 56, 60, 71, 69, 70, 74, 67, 289 R
See application file for complete search history.

(56) References Cited

U.S. PATENT DOCUMENTS

| 6,126,158 | A | * | 10/2000 | Engibarov | 269/136 |
| 6,202,997 | B1 | * | 3/2001 | Yasuda | 269/212 |
| 6,431,536 | B1 | * | 8/2002 | Maffeis | 269/203 |
| 6,554,264 | B1 | * | 4/2003 | Alford | 269/147 |
| 7,635,119 | B1 | * | 12/2009 | Patel | 269/73 |
| 8,167,289 | B2 | * | 5/2012 | Schar | 269/25 |
| 8,366,091 | B2 | * | 2/2013 | Harder | 269/315 |
| 2012/0049431 | A1 | * | 3/2012 | Chen et al. | 269/56 |

FOREIGN PATENT DOCUMENTS

| CN | 2272350 Y | 1/1998 |
| CN | 200977607 Y | 11/2007 |
| TW | 339716 | 9/1998 |
| TW | 561949 | 11/2003 |

* cited by examiner

*Primary Examiner* — Lee D Wilson
(74) *Attorney, Agent, or Firm* — Novak Druce Connolly Bove + Quigg LLP

(57) ABSTRACT

A slide positioning device includes a main body and a slide member slidable relative to the main body along a axis. The main body defines a plurality of positioning holes along the axis, and the slide member defines a plurality of positioning grooves along the axis. A rough positioning member is selectively received in one positioning hole to roughly position the sliding member. A fine positioning assembly includes a latch member selectively received in one positioning groove to precisely position the sliding member. A biasing member biases the latch member toward the sliding member.

19 Claims, 3 Drawing Sheets

SLIDE POSITIONING DEVICE

BACKGROUND

1. Technical Field

The present disclosure generally relates to positioning devices and, more particularly, to a slide positioning device providing multiple positions.

2. Description of Related Art

During film application processes, a workpiece must be precisely positioned on a work surface. Often, a specific clamp device is secured on the surface and the workpiece is held thereby. However, the position of the clamp device is set and non-adjustable. When multiple positions are to be processed, an active mechanism, such as a threaded rod and nut or gear-shaft combination, is required to move the clamp device, and directed by a controller, thus resulting in an excessively complex structure and increased cost.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
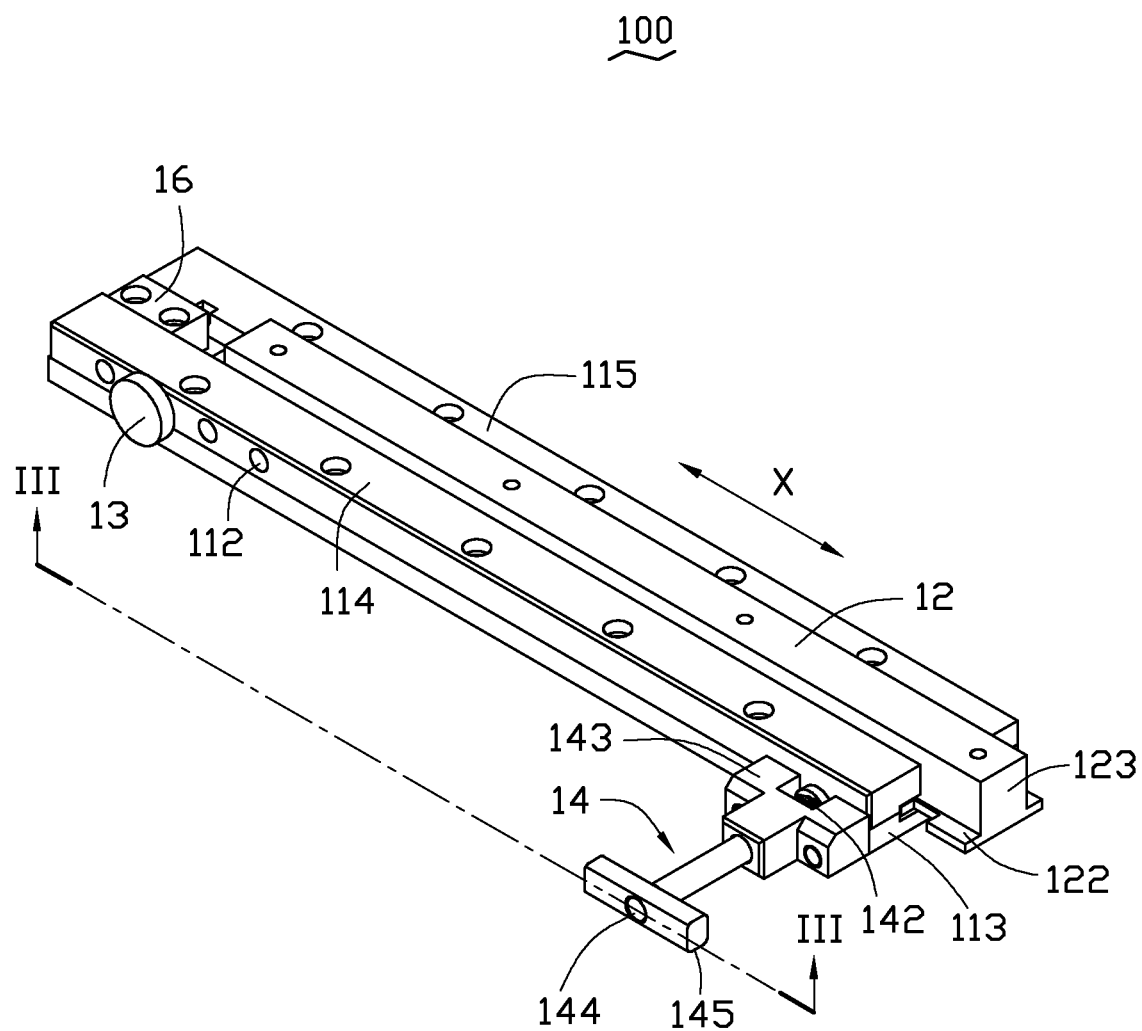
FIG. 1 is an assembled, isometric view of one embodiment of a slide positioning device.
Figure 2:
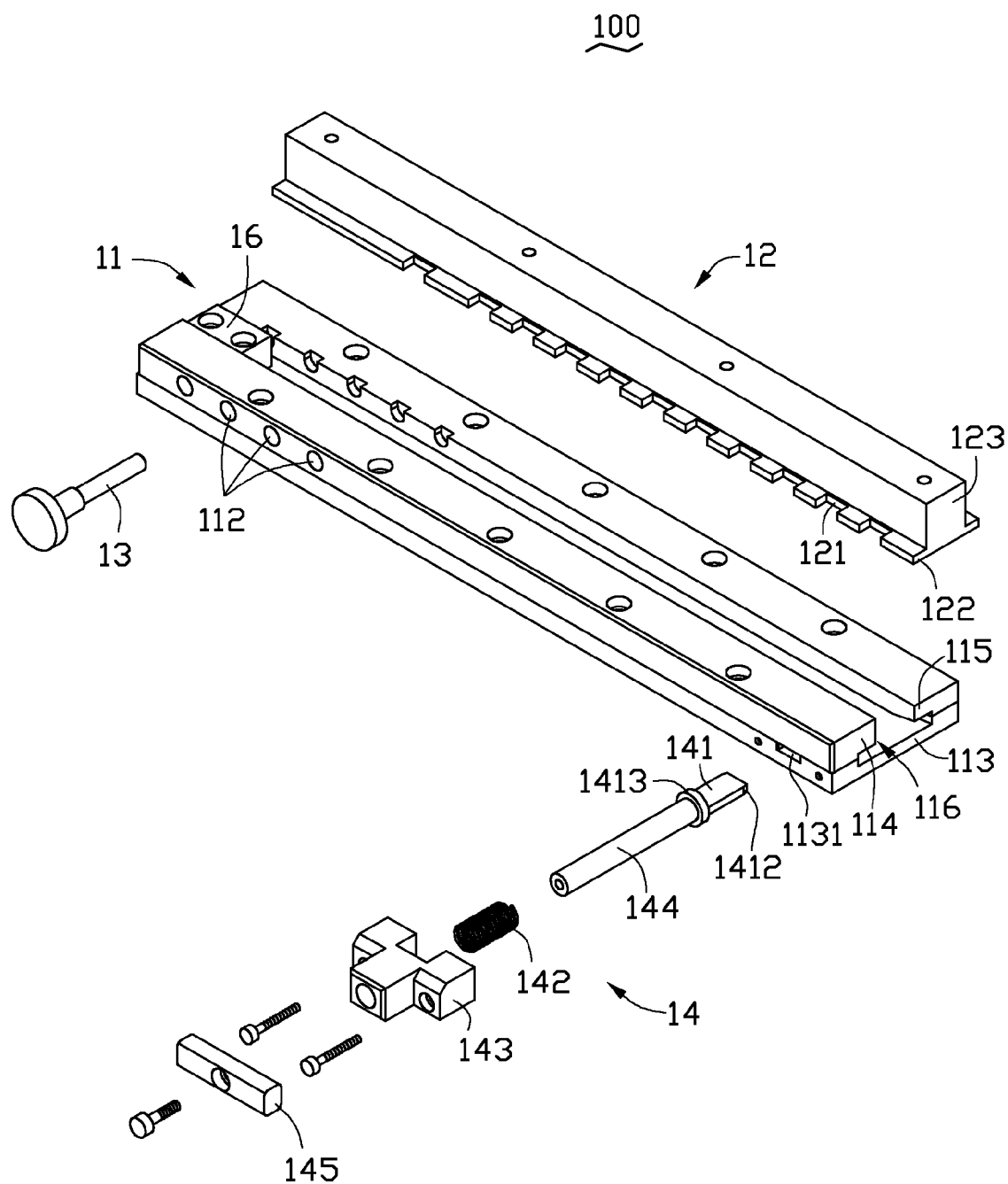
FIG. 2 is an exploded, isometric view of the slide positioning device of FIG. 1.
Figure 3:
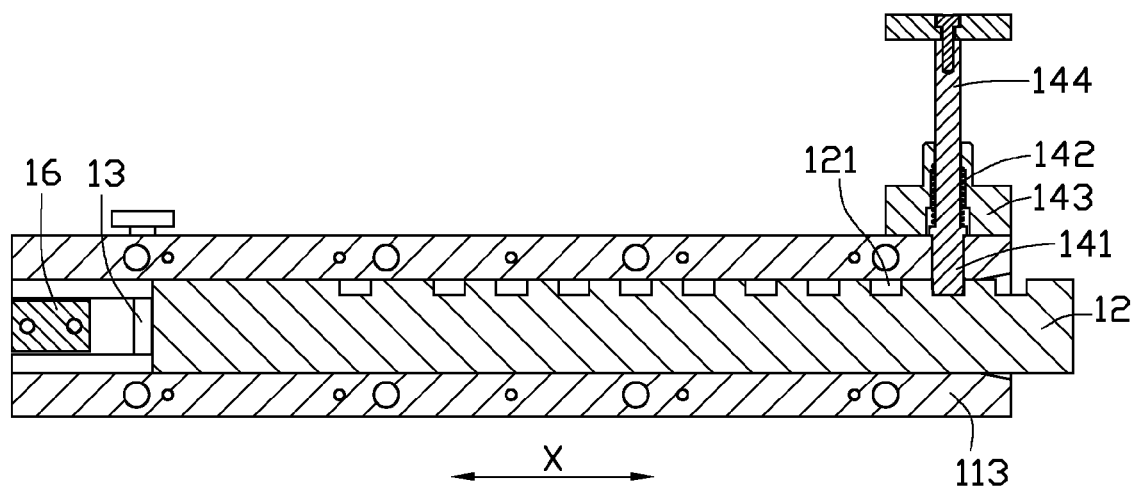
FIG. 3 is a cross section of the slide positioning device, taken along a line III-III in FIG. 1.

Referring to FIGS. 1 through 3, one embodiment of a slide positioning device 100 includes a main body 11, a slide member 12 slidable relative to the main body 11 along an axis X, a rough positioning member 13, and a fine positioning assembly 14. The rough positioning member 13 and the fine positioning assembly 14 cooperatively position and hold the slide member 12 in multiple positions.

The main body 11 defines a plurality of positioning holes 112 arranged evenly along the axis X. The rough positioning member 13 is selectively received in a positioning hole 112 and contacts the slide member 12, thus roughly positioning the slide member 12. The slide member 12 defines a plurality of positioning grooves 121 arranged along the axis X. The fine positioning assembly 14 includes a latch member 141 selectively received in one of the positioning grooves 121, and a biasing member 142 biasing the latch member 141 towards the slide member 12. When the positioning groove 121 misaligns with the latch member 141 due to position deviation, the latch member 141 can be received in the corresponding positioning groove 121 by force applied by the biasing member 142. When the latch member 12 is moved along the axis X, the latch member 141 can slide into and be received in a positioning groove 121 upon reaching a position where the latch member 12 substantially aligns with the positioning groove 121, thus facilitating the positioning operation. Higher precision can be achieved by improving the dimensional and receiving accuracy of the latch member 141 and the positioning groove 121.

In one embodiment, the main body 11 includes a bottom plate 113, a first side plate 114 and a second side plate 115 positioned on opposite sides of the bottom plate 113. The bottom plate 113, the first side plate 114, and the second side plate 115 extend along the axis X, and cooperatively define a T-shaped slide groove 116.

The slide member 12 has a T-shaped cross section, and includes a slide rail 122 slidably received in the slide groove 116 and a connecting portion 123 integrally formed with the slide rail 122. The connecting portion 123 can be secured to a workpiece. The positioning grooves 121 are defined on a side surface of the slide rail 122 toward the first side plate 114, and are distributed evenly along the axis X.

The rough positioning member 13 is a pin, attachable to an end of the slide member 12, thus roughly positioning the slide member 12.

The latch member 141 and the positioning grooves 121 have rectangular cross sections. In order to facilitate the latch member 141 into the corresponding positioning groove 121, the latch member 141 forms two guide portions 1412 in the end toward the positioning groove 121. In the illustrated embodiment, the guide portion 1412 is a rounded corner.

The fine positioning assembly 14 includes a mounting base 143 fixed to the main body 11, and the mounting base 143 defines a through hole (not labeled) substantially perpendicular to the axis X. An impeller 144 is rotatably received in the through hole, and an operation bar 145 is fixed to the impeller 144. The bottom plate 112 of the main body 11 defines a through hole 1131 communicating with the slide groove 116. The latch member 141 is rotatably received in the through hole 1131 and received in the positioning groove 121. One end of the impeller 144 is fixed to the latch member 141 and forms a flange 1413, and the opposite end of the impeller 144 extends out of the mounting base 143. In this embodiment, the latch member 141 and the impeller 144 are integrally formed.

The biasing member 142 is a helical spring surrounding the latch member 144, and positioned between and abutting the flange 1413 and the mounting base 143. Thereby, the latch member 141 can be withdrawn from the positioning groove 121 by pulling the impeller 144.

The slide positioning device 100 further includes a stopper 16 positioned on a distal end of the main body 11 to prevent the slide member 14 from sliding out of the main body 11. It should be understood that the flange 1413 of the impeller 144 can be omitted, and the biasing member 142 positioned between and abutting the first side plate 114 of the main body 11 and the mounting base 143.

In use, the latch member 141 is withdrawn from the positioning groove 121 and the rough positioning member 13 is pulled out from the positioning hole 112. The slide member 12 is moved to a predetermined position along the axis X. Then, the rough positioning member 13 is received in the positioning hole 112, substantially aligned with the predetermined position to roughly position the slide member 12. The impeller 144 is released, and the latch member 141 is received in a corresponding positioning groove 121 by force applied by the biasing member 142, thus precisely positioning the slide member 12. Accordingly, the slide positioning device 100 can be easily maintained in multiple predetermined positions. In addition, the slide positioning device 100 presents a simplified structure and a minimized cost.

It is believed that the present embodiments and their advantages will be understood from the foregoing description, and it will be apparent that various changes may be made thereto without departing from the spirit and scope of the disclosure or sacrificing all of its material advantages.

The invention claimed is:

1. A slide positioning device comprising:
a main body;

a slide member slidable relative to the main body along an axis, wherein the main body defines a plurality of positioning holes arranged along the axis, and the slide member defines a plurality of positioning grooves arranged along the axis;

a rough positioning member selectively received in one positioning hole to roughly position the sliding member; and a fine positioning assembly comprising a latch member selectively received in one positioning groove to precisely position the sliding member, and a biasing member biasing the latch member toward the sliding member.

2. The slide positioning device of claim 1, wherein the latch member forms at least one guide portion in an end toward the plurality of positioning grooves.

3. The slide positioning device of claim 2, wherein the guide portion is a rounded corner.

4. The slide positioning device of claim 1, wherein the latch member and each of the positioning grooves have rectangular cross sections.

5. The slide positioning device of claim 1, wherein the main body comprises a bottom plate, a first side plate, and a second side plate positioned on opposite sides of the bottom plate; and the bottom plate, the first side plate, and the second side plate extend along the axis and cooperatively define a T-shaped slide groove.

6. The slide positioning device of claim 5, wherein the slide member has a T-shaped cross section and comprises a slide rail slidably received in the slide groove.

7. The slide positioning device of claim 6, wherein the plurality of positioning grooves are defined on a side surface of the slide rail toward the first side plate and distributed evenly along the axis.

8. The slide positioning device of claim 5, wherein the bottom plate defines a through hole communicated with the slide groove, and the latch member is rotatably received in the through hole.

9. The slide positioning device of claim 1, wherein the plurality of positioning grooves are distributed evenly along the axis.

10. The slide positioning device of claim 1, wherein the plurality of positioning holes are distributed evenly along the axis.

11. The slide positioning device of claim 1, wherein the rough positioning member is a pin attachable to an end of the slide member.

12. The slide positioning device of claim 1, wherein the fine positioning assembly further comprises a mounting base fixed to the main body and defining a though hole, an impeller is movably received in the through hole, and an operation bar is fixed to the impeller, wherein the impeller is fixed to the latch member, and the biasing member is positioned between and abutting the mounting base and the main body.

13. The slide positioning device of claim 1, wherein the slide positioning device further comprises a stopper positioned on an end of the main body to prevent the slide member from sliding out of the main body.

14. A slide positioning device comprising:
a main body defining a slide groove extending along an axis;
a slide member forms a slide rail slidably received in the slide groove, wherein the main body defines a plurality of positioning holes arranged along the axis, and the slide member defines a plurality of positioning grooves arranged along the axis;
a rough positioning member selectively received in one positioning hole to contact an end of the slide member to roughly position the sliding member; and
a fine positioning assembly comprising a latch member selectively received in one positioning groove to precisely position the sliding member, and a biasing member biasing the latch member toward the sliding member.

15. The slide positioning device of claim 14, wherein the latch member forms at least one guide portion in an end toward the plurality of positioning grooves.

16. The slide positioning device of claim 15, wherein the guide portion is a rounded corner.

17. The slide positioning device of claim 14, wherein the plurality of positioning grooves and the plurality of positioning holes are distributed evenly along the axis.

18. The slide positioning device of claim 14, wherein the fine positioning assembly further comprises a mounting base fixed to the main body and defining a though hole, an impeller is movably received in the through hole, and an operation bar is fixed to the impeller, wherein the impeller is fixed to the latch member, and the biasing member is positioned between and abuts the mounting base and the main body.

19. The slide positioning device of claim 14, wherein the slide positioning device further comprises a stopper positioned on an end of the main body to prevent the slide member from sliding out of the main body.

* * * * *